106-98 AU 113 EX
11/10/81 XR 4,299,633

United States Patent [19]
Ito et al.
[11] 4,299,633
[45] Nov. 10, 1981

[54] METHOD OF PREPARING GREEN COMPOSITIONS CONTAINING A HYDRAULIC SUBSTANCE AND METHOD OF UTILIZING THE SAME

[75] Inventors: Yasuro Ito, 38-16, Numabukoro 4-chome, Nakano-ku, Tokyo, Japan; Yoshiro Higuchi, Tokyo, Japan; Yutaka Mochida; Sampei Kemmochi, both of Hakodate, Japan; Hideharu Kaga, Tokyo, Japan; Yasuhiro Yamamoto, Fujisawa, Japan

[73] Assignees: Yasuro Ito; Taisei Corporation, both of Tokyo, Japan

[21] Appl. No.: 119,562

[22] Filed: Feb. 7, 1980

[30] Foreign Application Priority Data

Feb. 7, 1979 [JP] Japan ................ 54/12164

[51] Int. Cl.$^3$ ................ C04B 7/02
[52] U.S. Cl. ................ 106/97; 106/98; 106/99; 106/110
[58] Field of Search ................ 106/97, 98, 99, 110; 264/117

[56] References Cited

U.S. PATENT DOCUMENTS

| | | | |
|---|---|---|---|
| 2,650,171 | 8/1953 | Schaaf | 106/98 |
| 2,835,602 | 5/1958 | Benner | 106/98 |
| 3,192,060 | 6/1965 | Tilsen | 106/97 |
| 3,503,771 | 3/1970 | Kroyer | 106/97 |
| 4,127,417 | 11/1978 | Okada et al. | 106/99 |

*Primary Examiner*—James Poer
*Attorney, Agent, or Firm*—Birch, Stewart, Kolasch & Birch

[57] ABSTRACT

A green concrete mortar is prepared by the steps of preparing a first composition in which water is uniformly deposited about the particles of sand, preparing a second composition consisting of a powder of cement, mixing together the first and second compositions, thus forming stable shells about the particles of the sand, the shells having substantially a constant ratio of water to cement, and adding water to the shelled sand and then kneading the resulting mixture. The green concrete mortar can be poured into a moulding frame prepacked with a coarse aggregate i.e. gravel. After incorporating gravel into the mortar, the resulting green concrete can be moulded or blasted. The green concrete can be readily conveyed to a working station for constructing tunnels, buildings or the like.

22 Claims, 21 Drawing Figures

METHOD OF PREPARING GREEN COMPOSITIONS CONTAINING A HYDRAULIC SUBSTANCE AND METHOD OF UTILIZING THE SAME

BACKGROUND OF THE INVENTION

This invention relates to a method of preparing a green composition containing hydraulic substance and a method of utilizing the same.

In the preparation of green mortar or green concrete containing a powder of hydraulic substance and water containing sand, even when the percentage of the ingredients is controlled such that concentration of a cement paste utilized will have the same water to cement ratio the quality of the product is not always the same. The present invention relates to a method by which the surface of a fine aggregate is covered with a stable coating of a hydraulic substance so as to obtain a green composition free from any segregation, bleeding and precipitation of the aggregate, thus obtaining concrete products having uniform mechanical strength and stability. According to the method of this invention even when the concentration of the composition is small, the hydration reaction takes place under a state in which coated or shelled sand particles having a small water to cement ratio are in a continuously contacted state, such state binding the portion of the composition having a large water to cement ratio thus manifesting a high mechanical strength which allows for the manufacture of various concrete products having high dimensional accuracies.

Products prepared by using such hydraulic substances as cement and plaster, are widely used in various civil works, and for constructing buildings or the like and efforts have been continuously made for improving the method of incorporation and mixing the ingredients of green concrete or green mortar and to develop new additives as dispersing agents and improved cement. Despite such numerous researches and experiments there still remains a number of problems to be solved so it has been difficult to obtain products of stable quality. Especially, the solution of the problems of segregation, bleeding and precipitation which occur after sand particles have been coated with a hydraulic substance is the most important, so that samples for measuring the mechanical strength were obtained after removing portions in which bleeding or precipitation has occurred. In the past, it was assumed that the concentration of a green paste prepared by admixing such ingredients as water, a powder of cement, a fine aggregate as sand, a coarse aggregate and various dispersing agents was constant. In other words, it has been considered that the products utilizing the identical aggregates, and the same water to cement ratio would have the same strength. In a method utilizing a high grade dehydration agent, a mass of cement was dispersed with a dieta potential, but in this method, consideration was not made for the variation in the concentration of the paste utilizing water containing sand, as above described.

SUMMARY OF THE INVENTION

Accordingly, it is an object of this invention to provide a novel method of preparing a green composition containing a hydraulic substance capable of obviating the various problems described above.

According to this invention there is provided a method of preparing a green composition utilizing a hydraulic substance wherein a powder of the hydraulic substance is admixed with liquid, and a fine aggregate, characterized in that said method comprises the steps of preparing a first composition in which the liquid is uniformly deposited on substantially the entire surface of the particles of the fine aggregate; preparing a second composition consisting essentially of a powder of the hydraulic substance, mixing together the first and second compositions, thus forming shells about the particles of the fine aggregate, the shells having substantially a constant ratio of the liquid to the powder of the hydraulic substance; and adding the liquid to shelled fine aggregate and then kneading the resulting mixture.

Usually the hydraulic substance is cement, the liquid is water and the fine aggregate comprises natural river sand or light weight artificial fine sand. Since stable shells are formed about the particles of the sand it becomes possible to use sea sand containing salt and other harmful substances. The shells act to seal these harmful substances which otherwise affect steel bars or beams usually used in concrete structures. When a sealed frame containing prepacked coarse aggregate, i.e. gravel, is used, the green composition, that is the cement mortar can be poured into the sealed frame. The cement mortar may be conveyed to a remote construction station through a hose, pipe or a tank. In this case the gravel may be added during preparation of the cement mortar or at the construction station. The water content may be adjusted at the construction station by adding it to make the concentration of the green concrete to a value suitable for blasting.

BRIEF DESCRIPTION OF THE DRAWINGS

Further objects and advantages of the instant application can be more fully understood from the following detailed description taken in conjunction with the accompanying drawings in which.

DESCRIPTION OF THE PREFERRED EMBODIMENTS

Figure 1:
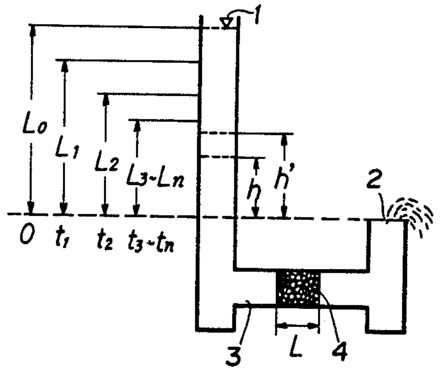
FIG. 1 is a diagrammatic representation of a fluidity measuring device utilized to measure the fluidity of the green composition prepared by the method of this invention.

Before describing in detail concrete examples of this invention, the principle of this invention and the background thereof will firstly be described. The specific surface area of such fine aggregate as sand utilized in the preparation of green concrete or green mortar is large so that the amount of the surface water adhering to the surface of the sand and the state of adhesion greatly influences a unit water quantity of a prepared green compound and the strength of the product prepared therefrom. Thus, the quantity of the surface water of the fine aggregate varies in a wide range. For example, even river sand produced from the same source and piled up in the same yard, has greatly different quantity of the surface water in the surface portion and the inner portion, and even with sand in the same surface portion, the quantity of surface water varies with time according to atmospheric conditions (fine or rainy). The quantity of the surface water greatly influences the water to cement ratio W/C and cement to sand ratio C/S of the resulting composition thus substantially varying the quality thereof. Even with the same quantity of the surface water, when the percentage of water exceeds 3–4% for fine sand, 4–5% for medium size sand, and 6–10% for coarse sand the surface water begins to flow so that the state of adhesion thereof varies with time which governs the strength of the product. For this reason, when actually preparing a composition it has been the practice to accurately measure the quantity of the surface water of sand for the purpose of correcting the amount of water to be incorporated into the composition according to the measured value. Even in such controlled compositions (concrete or mortar) the fluidity, moldability and the strength of the resulting product differ greatly. Such large differences are inevitable in the products of this type and omitted from the result of measurement by considering that these errors are inevitable for natural aggregates or caused by capping. Accordingly, a reliable quality is determined by the lower limit of the variation thus making it difficult to obtain products of high qualities.

Although the fluidity of the compound is generally measured with a rotary viscosimeter, the result obtained with this meter mainly relates to fluid factors, and is different from that of a pure fluid. In a case of a green composition containing granules such as a fine aggregate, special phenomena such as $\Sigma$ effect or lamination are involved, and the actual mechanism is difficult to be clearly understood. These phenomena are often expressed by a term "workability". This term has an extremely wide meaning and in some cases includes various conditions in the field or the experience of the workman so that its true meaning is still vague. For this reason, it is necessary to rely upon a large safety factor. Incorporation of a dispersion agent proportionally decreases the quantity of water to be incorporated to increase fluidity, but the difficulty described above still remains unsolved.

We have already proposed a method of utilizing a decreased pressure for obtaining an accurate method of measuring in a short time and without consuming any energy with reference to such aggregate as sand, as disclosed in Japanese patent application No. 147180/1976, (Japanese laid open patent application No. 71859/1978), and a preferable method of measuring in the field the fluidity of a green compound as disclosed in Japanese patent application No. 157,452 of 1976 (Laid open patent specification No. 82389/1978). According to the first method, it is possible to obtain surface dry sand or sand uniformly adhered with surface water of a predetermined quantity by removing air adhering to the surface of the aggregate by a pressure reducing technique, thus making it possible to make measurement having lesser variation than Inandator process. Accordingly, this method is an extremely advantageous practical method. In the later method, many new facts were found regarding the green compound belonging to a Bingham type fluid manifesting peculiar fluid charactersitics, including relative initial shear strength yielding value $F_o$, a relative closure coefficient $\Delta F_o$, and a relative fluidity viscosity coefficient $\lambda$. Further, the fluidity characteristic of such green composition as prepacked concrete can be determined by using a pouring condition presuming experimental equation suitable for practical conditions.

Based on these prior art methods we have found new facts in the green composition by which the strength of the product can be improved and the quality of the product can be improved by decreasing the difference in the quality, thus obtaining molded products of high dimensional accuracies. More particularly, we have found formation of specific coating layers or shells on the surface of the sand particles in which cement component is difficult to remove with washing immediately after admixing of the compound. The state of forming the coating layers and the amount thereof vary depending upon the percentage and state of adhesion of the surface water of the sand used. When these parameters are selected suitably, stable coatings can be obtained, and in such stable states the ratio W/C is substantially constant. We have found that even when the composition is uniformly admixed, the concentration of the cement paste component present between coated particles differs depending upon the state of the formed coatings, and the amount of the cement paste. More particularly, as above described, the stable coatings of sand particles are formed naturally, in spite of many field operations, such fact has not yet been confirmed due to the fact that air layers usually present at least on a portion of the particle surfaces, that when the composition is prepared with an excess amount of cement the coatings are contaminated by unstable and separable cement powder, that the particle size of a fine aggregate is small so that even when stable coatings are formed it has been difficult to confirm the formation thereof, and that the percentage of the surface water exceeds a certain limit, the coatings become unstable due to excess water. We have also found that when the green composition is prepared by successively incorporating a small quantity of cement to water containing sand, a peak appears in the mixing torque, and that although the point at which the peak of the mixing torque appears varies depending upon the amount of water contained in the sand there is a definite relationship between the peak and the amount of water contained in the sand. We have also found that the amount of the cement shells which are difficult to peel off from the sand particles becomes a maximum when the amount of the water adhering to the surface of sand lies in a specific range, and that a mortar having such stable cement shells improves the quality and stability of the products. The invention is based on these discoveries and confirmations, and the detail of the present invention will be described hereinafter. As above described, the percentage of water contained in such fine aggregate as sand and the state of adhesion of the water constitute important factors of this invention, and the percentage of water in the fine aggregate is determined in the following manner. A portion of the water permiates into the particle construction or structure, whereas the remaining portion adheres or deposits on the surface of the fine aggregate. Strictly speaking, the former portion is the absorbed water whereas the latter portion may be said as the surface water. In this invention, the performance of a mixture or composition prepared by admixing a fine aggregate and a powder of such hydraulic substance as cement is important and since the completion of a hydration reaction requiring a long time is not taken into consideration, the water impregnated into the particle construction or structure is not required to be considered. Because, in this invention, only the water adhered to the surface of fine aggregate that is the difference between the so-called percentage of water content and the percentage of the absorbed water is taken into consideration, theoretically, the amount of the water adhered to the surface of the fine aggregate is always smaller than the percentage of the water content. One may consider that it would be difficult to separate the percentage of water content into the percentage of the absorbed water and the percentage of the adhered water. However with regard to fine aggregates, in JIS (Japanese Industrial Standard) A1109, it is defined that the limit for the presence or absence of the water adhered to the surface of sand particles should be measured with a frustoconical shaped measuring means. More particularly, the limit should be determined by the fact that whether sand filled in a frustoconical shaped measuring device having a bottom inner diameter of 89 mm, a upper inner diameter of 38 mm and a height of 74 mm disintegrates or not, and the percentage of water above this limit (i.e., not disintegrate condition) is taken as the amount of the adhered water. Of course, the invention follows the definition described above.

Describing one of our discoveries, we have prepared a number of samples containing different amounts of the adhered water and a powder of cement was sequentially incorporated into the sand followed by admixing. In each sample, we have found that although the mixing torque increases with the increase in the amount of cement, the increase shows a peak at a certain point, and thereafter the mixing torque decreases, and that there is a definite relationship between the peak of the mixing torque and the amount of the surface water. More particularly, we have found the fact that when the mixing torque necessary to sequentially add a powder of cement to samples of sand having different percentage of surface water (hereinafter termed Sw) is expressed by the torque (ampere) of an electric motor for driving a mixer, the amount of cement manifesting the peak increases with the increase in the value of Sw, and that there is a definite relationship therebetween. Thus, it was confirmed that the mixing torque shows a peak when the ratio W/C determined by the value of Sw and the amount of the cement incorporated reaches about 10%.

We have also measured the relative shear stress yielding value $F_o$, the relative closing coefficient $\Delta F_o$, and the relative flow viscosity coefficient λ according to the method disclosed in the aforementioned Japanese patent application No. 157452/1976 and also investigated the relationship between these measured parameters and the percentage of the initial surface water of an aggregate (sand) determined by the method disclosed in the aforementioned Japanese patent application No. 147180 of 1976. A suitable measuring device is shown in the Japanese patent application No. 157452/1976 but we have used a measuring device as shown in FIG. 1 of the accompanying drawing, which has a vertical pouring leg 1 on one side, a vertical overflow leg 2, on the other side and having a lesser height than the pouring leg, and a connecting leg 3 interconnecting the legs 1 and 2 and having a packed layer or region 4 having a predetermined length L and packed with glass beads having a diameter of 25 mm. When the green composition, i.e. mortar poured from the upper end of the pouring leg 1 begins to overflow from the upper end of the leg 2 a head difference h is measured and the relative initial shearing stress yielding value $F_o$ was determined by the following equation I $$F_o = \rho h/L \qquad \text{I}$$

where $\rho$ represents the specific gravity of the green composition.

The relative closing coefficient $\Delta F_o$ was determined according to the following equation II by measuring again the initial shearing stress yielding value $F_o'$ with the same device shown in FIG. 1 by pouring a predetermined green composition (mortar) after the measurement of the value $F_o$ and then obtaining the difference between $F_o$ and $F_o'$.

$$\Delta F_o = \frac{(h - h')\rho}{(l_o - h')L} \qquad \text{II}$$

where $l_o$ represents the difference in the heights of legs 1 and 2.

Furthermore, the relative flow viscosity λ was determined by the relationship between pressure and speed when the green composition was caused to flow under gravity through an air gap as shown by the following equation III $$\lambda = Pu/Uf \qquad \text{III}$$

where $Pu = (l_o + l_1/2)\rho/L$ and $Uf = (l_o - l_1/t_1)$ and Pu represents a speed pressure ($g/cm^3$) and Uf a vacant column speed.

Figure 2:
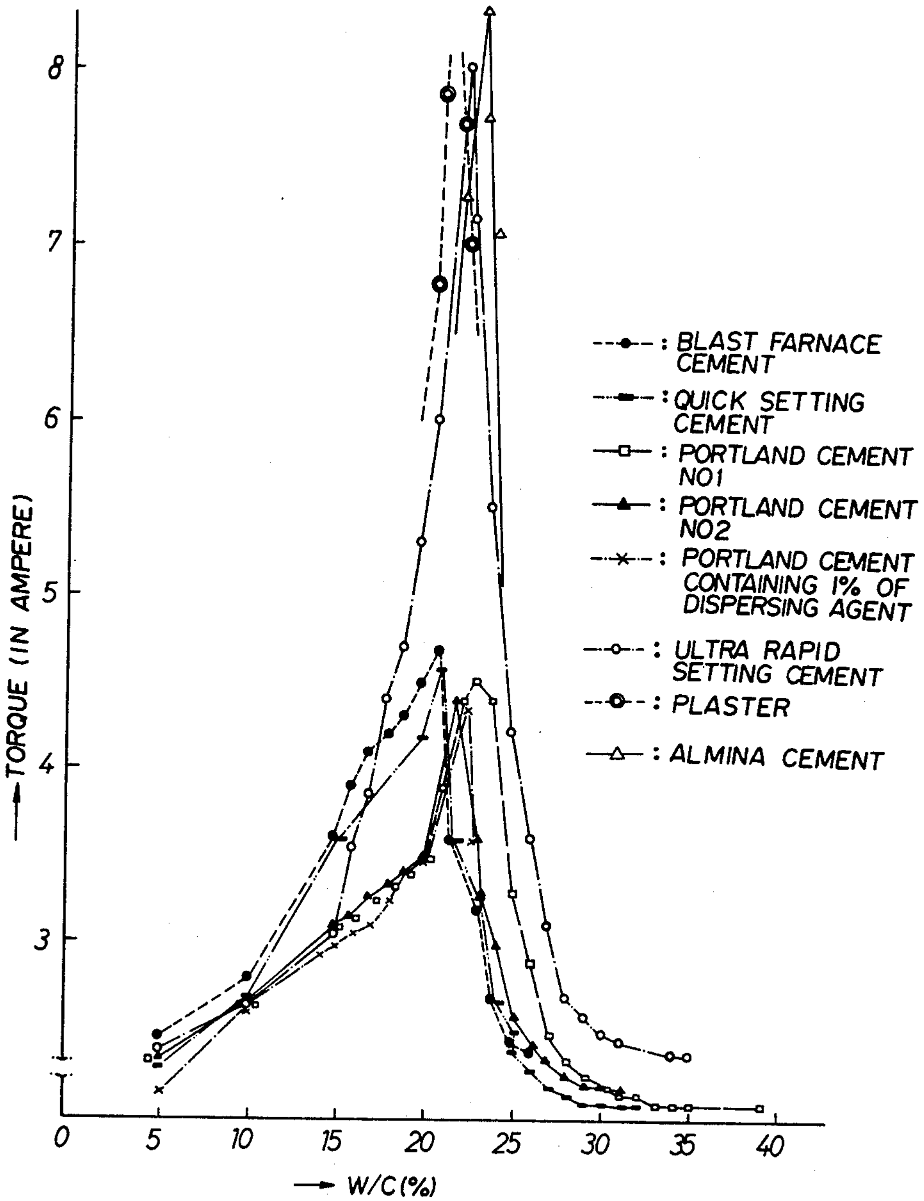
FIG. 2 is a graph showing the relationship between the water to cement ratio and the mixing torque necessary to admix powders of various hydraulic substances.

The result of measurement of the mixing energy for various hydraulic substances is shown in FIG. 2. In this case, 15 Kg of ordinary Portland cement (No. 1) containing 4% of water was disposed in a motor driven mixer and then water was sequentially added to obtain a paste. Two samples of paste, one incorporated with 1% of a dispersing agent consisting of polyalkyl aryl sulfonate, and the other is a plain paste not incorporated with any dispersing agent, and the torque of the mixer of the first time was measured with an ammeter. A maximum mixing energy was consumed at a ratio of W/C between 20 and 24%, particularly between 21 and 23% irrespective of the presence or absence of the dispersing agent, while the mixing energy showed a substantially constant value at about 29% of the ratio W/C. The same is true for rapid setting cement although the peak appears at a slightly different ratio of W/C, i.e. at about 21%, but this percentage is contained in the range of 20-24%, more particularly 21-23%. In the case of a ultra rapid setting cement (super bellow cement) the torque becomes a peak more rapidly than the cements described above, the peak having a large value. In this case, the peak appears in a range of 22.5-23% which is within the range described above. In the case of alumina cement, the torque varies in the same manner although its peak appears at a W/C ratio higher than 23%. Also in the case of plaster, although the torque rapidly increases to a high value, the ratio of water to plaster which corresponds to W/C ratio shows a peak in the same range and we have found that the torque variation in a case wherein mixing operation is performed while the amount of water in the paste is gradually increased is essentially the same. With regard to the relationship between the result shown in FIG. 2 and the mixing torque peak which appears at a W/C ratio of about 10%, this mixing torque peak at about the W/C ratio of about 10%, is caused by the water adhering to the sand particles, whereas in the case shown in FIG. 2, although there is no adhered water, a peak appears in the same manner, and we believe that the peak shown in FIG. 2 means the highest aggregation state in relation to the ratio W/C caused by a powder of a hydraulic substance used.

Considering the above described variation in the mixing torque, where water is added to the powers of various types of the hydraulic substances, there occurs six states, that is $F_1$ and $F_2$ of pendular and capillary states because there are different states, namely a state in which no water is added to a powder of a hydraulic substance, a slurry state in which the interstise between the particles are completely filled with water, in other words, a state in which air is present between the particles, and a state in which free water is present continuously or discontinuously. Among these 6 states, the capillary state in which the free water is discontinuous, whereas the film water is continuous requires the maximum mixing energy, and it is presumed that this state occurs at the position of the peak of the mixing torque in a range of 20 to 24% ratio and that thereafter the composition becomes slurry at about 29% ratio where the mixing energy becomes constant and stabilized by subsequent addition of water.

In a mixture of an aggregate (river sand) and cement, the values of $F_O$, $\Delta F_O$ and flow vary depending upon the percentage and the state of adhesion thereof to the surface of the particles of the river sand. More particularly, these values increase as the amount of the adhered water increases and reach maximum values when water uniformly covers the particles. Thereafter these values decrease gradually. The relationship between the percentage of the surface water at which maximum values appear and the sand to cement ratio S/C is shown in the following Table 1 showing that so long as the ratio S/C is definite, the peaks of said values appear at substantially the same percentage of the surface water.

TABLE 1

| Characteristic value | Optimum surface water (%) S/C = 0.8 | S/C = 1.0 | S/C = 1.2 |
|---|---|---|---|
| Fo | 30 | 20 | 15 |
| ΔFo | 23.8 | 20 | 15 |
| flow value | 30 | 15 | 15 |

It was also found that λ does not vary with the percentage of the surface water. Irrespective of the fact that the characteristic values vary depending upon the percentage of the surface water, it should be noted that the values of $F_O$, etc. manifest their maximum values during fluidity tests. $F_O$ may be considered as a limit value of the flow resistance at the time when a plastic fluid flows through a definite flow path so that it is considered that the value $F_O$ would be greatly influenced by the diameter of the particles in the fluid. Consequently, from the fact that the value of $F_O$ is greatly influenced by the percentage of water uniformly deposited in the surface of the particles of the aggregate (sand) and the fact that the occurrence of the peak is specified by the percentage of the surface water, it can be presumed that when sand and cement are admixed, the powder of cement is adsorbed by the surface water and that the amount of the adsorbed water is determined by the initial percentage of the surface water. In other words, when sand and water are mixed together, shells or coatings are formed on the peripheries of the sand particles thus increasing the apparent particle diameter. In this manner, the amount of the shells formed by the cement adsorbed by the sand particles increases in proportion to the amount of the surface water of the sand. Even though the shells are relatively soft, they have a certain degree of aggregation that prevents peeling off under the condition of flow described above. This state corresponds to a cement paste in the capillary region described above.

For the purpose of actually confirming this fact, in a composition preparing by using sand, cement and water at ratios of S/C of 1.0, W/C of 35% and 0.9% by weight based by the weight of the sand of a dispersing agent the percentage of water uniformly adhered to the sand particles was varied variously in a range of from 5 to 35%. In this case sand and cement were admixed for one minute, then a quantity of water satisfying said ratio W/C of 35% was added and compounded for one minute. Then after the incorporation of the dispersion agent the mixture was admixed for another one minute. The micrographs of the samples thus prepared are shown FIGS. 3A through 3G. Theses micrographs were prepared with a factor of multification of 80 and FIGS. 3A-3G show compositions having surface water of 5%, 10%, 15%, 20%, 25%, 30% and 35% respectively. Although cement powder adheres even when the ingredients are admixed in a dry state or with very small percentage of the surface water, the amount of the deposited cement is small and moreover as the deposited cement is unstable, any appreciable number of stable shells would not be formed. The shell forming capability increases gradually starting from the percentage of the surface water of about 10% and becomes a maximum near the percentage of the surface water of about 15-25% thus forming particles having smooth and round surfaces by eliminating irregularity of the particle surface.

Figure 3A:
FIGS. 3A-3G are photographs showing by a magnifying factor of 80 the steps of forming coatings or shells of the hydraulic substance about the particles of a fine aggregate in which FIGS. 3A-3G respectively show the cases in which the water to cement ratio (W/C) are 5%, 10%, 15%, 20%, 25%, 30% and 35%.
Figure 3B:
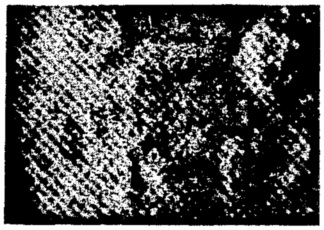
Figure 3C:
Figure 3D:
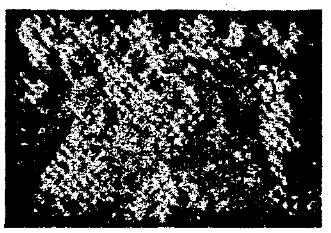
Figure 3E:
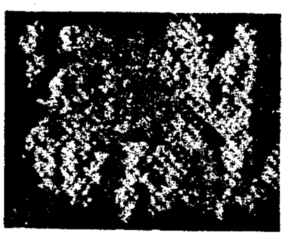
Figure 3F:
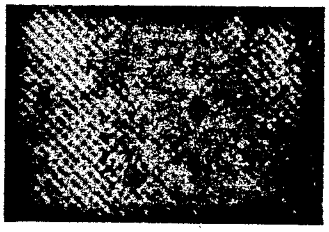
Figure 3G:
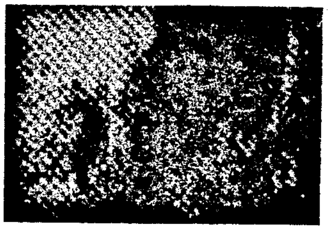

However, as the percentage of the surface water exceeds about 25%, the shell forming capability becomes irregular thus causing surface irregularity. Thus, even when the percentage of the surface water is higher than a certain limit, the cement can be deposited to form shells, since excess water is remaining on the surface of the sand particles after forming the cement shells, and the formed shells are unstable and liable to peel off, as shown by FIG. 3G. of course, even when the mean percentage of the surface water lies in a range of from 15 to 20% if the percentage were smaller or larger at some portions of the sand surface, the shells at such portions would be unstable. Considering the surface of a single sand particle, air present at some portions of the particle or excess water may be present at such portion thus causing the coated sand as a whole to be unstable.

Figure 4:
FIG. 4 is a perspective view showing the states of the green mortar prepared by the method of this invention and by a conventional method after washed with water.
Figure 5B:
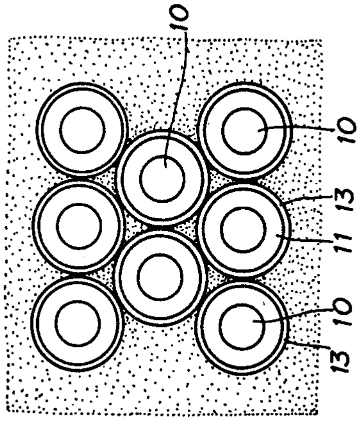
FIGS. 5A and 5B are diagrammatic representations of the manner of forming the shells according to this invention.
Figure 5A:
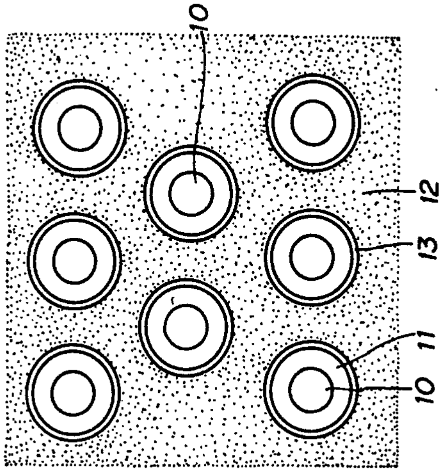

Moreover, in a case wherein the percentage of the surface water is 5% or 10%, although the shells are formed, more unstable coatings would be formed on the shells and such unstable coatings would readily peel off. Such peeled off coatings adhere to the shells of other sand particles and such process is repeated during the mixing and stirring step. Consequently, even when the percentage of the surface water is low, 5% for example, the surface of the sand particle would be coated by cement shells as shown in FIG. 5A, and the contour of the shells would follow the inherent contour of the sand particles. On the other hand, with the percentage of the surface water in a range of from 15 to 25%, unique shells can be formed which are spherical and can eliminate inherent surface irregularity of the sand particles. The shells thus formed are very stable and it was found that they would never peel off by further kneading operations or by mere washing with water. This state is shown by a photograph shown in FIG. 4.

A first mortar was prepared by adding and admixing a powder of cement in an amount obtaining a C/S ratio of 1:2 to sand particles having a uniform percentage of the surface water of 16%, to form a large quantity of cement shells and then incorporating and admixing a dispersing agent in an amount corresponding to 0.9% of the sum of water and cement so as to adjust the ratio W/C to 41%. Further, a second mortar was prepared by simultaneously incorporating water and cement to identical water containing sand having a percentage of the surface water of 2% and then adding 1.2% of a dispersing agent based on the weight of the cement, thus making C/S=1:2 and W/C=41% as in the first mortar. The amount of the dispersing agent was made to be slightly different for the purpose of making the result of fluidity measurement with a J funnel to be about 6.0 seconds for both mortars. Respective mortars were passed through a fine sieve that does not pass sand particles, immediately after preparation of the mortars. Then, the fine sieve was immersed in water contained in a pallet such that respective mortars would be perfectly immersed in the water. After maintaining the sieve for about 30 seconds in the immersed state, the sieve was vibrated in the vertical and horizontal directions to wash the mortar. After completion of the washing step the sieve was taken out from the water and the state of mortar remaining on the sieve is shown by FIG. 4, in which the lefthand side shows the first mortar while the righthand side the second mortar. As can be noted from this photograph, in the first mortar prepared by the prior art method, only the sand particles remain, whereas the second mortar according to this invention manifests substantially a perfect mortar. This means that the mortar deposited with shells according to this invention is stable such that shells would not be removed by water washing. This fact was confirmed by the examples of this invention and control examples to be described hereinafter, whereas the cement component of the mortar prepared by the prior art method readily peels off immediately after kneading.

In order to prepare a compound formed with stable shells, it is essential to make uniform the percentage of the state of adhesion of the surface water on the sand particles and to know the precise state. Because, as above described, since the ratio W/C of the stable shells must be substantially constant, if some portions have excessive or insufficient quantity of the surface water, it becomes impossible to form stable shells. Further, where the accurate amount of the surface water is not determined, it is difficult to determine an optimum amount of cement to be added. However, it is not always easy to make uniform the amount and state of deposition of the water on the surface of the sand particles and to know the amount of the surface water. This may be possible in a factory equipped with adequate measuring devices but impossible in a factory not equipped with such measuring devices. The shells are formed in a manner as shown in FIGS. 5A and 5B. Where a powder of cement is added in an amount exceeding to that corresponding to the amount of the surface water of the sand particles, the shells are formed as shown in FIG. 5A. Thus, cement shells 11 commensurate with the amount of the surface water are formed on the surfaces of sand particles 10, and about the shells 11 are formed unstable shells in a region outside of the capillary region in which water is deficient thus causing unstability. In such a state, remaining cement powder 12 stays in a powder form between the shelled sand particles. If the free cement powder 12 could be removed by a suitable expedient shells 13 would be formed in a region outside of the capillary region. Where the free cement is removed by wind power, for example, the W/C ratio would become substantially constant, as shown in FIG. 5B. As above described, since the W/C ratio of the shells is constant, it is easy to determine the concentration of the paste necessary to fill the interstices between the shelled sand particles and W/C ratio of the entire kneaded composition when water and cement are added into the composition and then kneaded to prepare a mortar. FIG. 5B shows that the method of this invention can be readily used in the field not equipped with any special measuring devices. Even when the cement or mortar is prepared in the field, the outer shells are similarly stable and the amount of the outer shells 13 is also constant because they are formed on the shells 11 having a constant W/C ratio. Consequently, during the succeeding kneading step the outer shells 13 may partially peel off, since the shells 11 are quite stable, so that their performance would never be impaired. In other words, the shells 11 formed by the initial surface water of the sand are extremely stable so that there is no fear of peeling off during the succeeding kneading step in which substantial quantities of water and a dispersing agent are incorporated.

Figure 6:
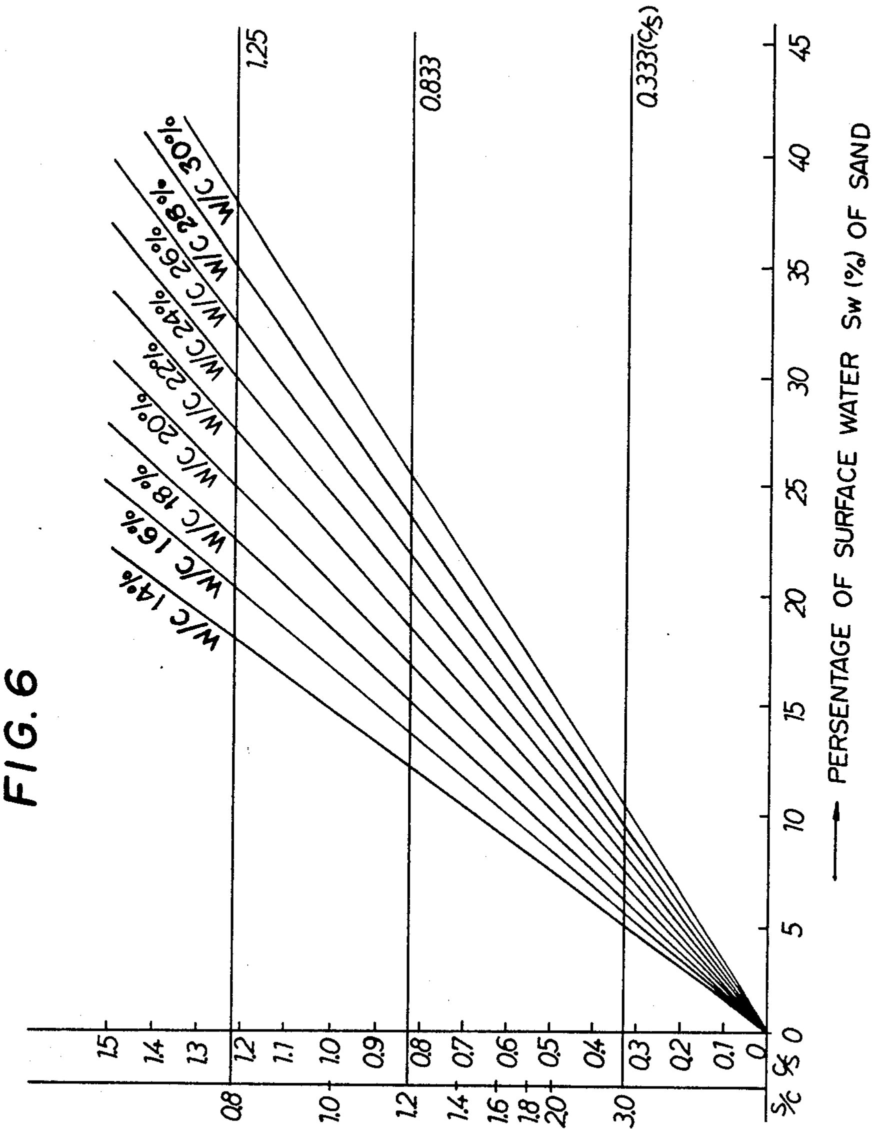
FIG. 6 is a graph showing the relationship between the percentage of surface water (S/C) and the percentage of incorporation of the hydraulic substance and the fine aggregate (C/S) in the composition.

FIG. 6 shows the relationship between the initial percentage of the surface water on the sand particles and the amount of added cement by taking various values of W/C ratio as a parameter. The graph shown in this figure proves that there is a definite relationship between the amount of the added sand and the percentage of the surface water of the sand. For example, to form shells having preferred W/C ratio between 24 and 26%, the ratio C/S may be selected to be about 0.35 for sand having a percentage of surface water of 10%. If the ratio C/S were higher than this value, the surplus cement would deposit on the shells thus gradually decreasing their W/C ratio. When the W/C ratio decreases below 18%, the surface portion becomes unstable, thus readily peeling off. Furthermore, if the W/C ratio of the shells exceeds 26%, the shells also become unstable due to surface water. For example, when the W/C ratio exceeds 29%, the tendency of peeling off becomes remarkable.

The mortar formed with stable shells imparts a large mechanical strength to the moulded products. In an actually used mortar, the interstices between the shelled sand particles are filled with water containing cement component so that the paste consisting of the cement component and water plays an important role for improving the mechanical strength of the products. According to this invention, the concentration (W/C) of the paste presenting between the shelled particles is adjusted by the secondary or succeeding kneading step. For this reason, the surplus composition is removed by wind power, for example, except a case wherein substantially all portions of the added cement are used to form stable shells. Even in a case wherein the primary kneading is performed with a substantially excessive amount of cement powder, the separation with wind power is efficient to substantially remove unstable free cement composition. For example, when the surplus cement composition is removed with an air quantity of about 0.3 $Nm^3$ per minute in a dry type continuous mixer having an inner diameter of 300 mm and a length of 3000 mm, the ratio W/C regarding the cement composition deposited on the sand particles was found to be about 18%. In this manner, since it is possible to accurately adjust the ratio W/C of the primary kneaded mortar by wind power separation it would be possible to accurately control the W/C ratio of the paste by the amounts of water and cement incorporated at the secondary kneading step.

From the foregoing description it will be clear that the invention is quite different from the prior art method in so far as the ratio W/C is concerned. In other words, according to the prior art method, the value of W/C is determined by the total quantities of cement and water added. In contrast, in this invention, so far as the water is concerned, the amount of the surface water and the state of adhering to the surface of the sand particles are taken as essential factors, by which the formation of shells and the W/C ratio of the paste between the shelled and particles are determined. Thus, the term W/C means a different concept for the instant invention and for the prior art method. In other words, in the prior art, the term W/C was used as an index representing the strength of the moulded products, and moreover it is impossible to accurately determine the water content of the fine aggregates. Due to these erroneous conceptions regarding W/C ratio, the strength of the products varies greatly even with the same value of W/C. In this invention, it shells were formed adequately and correct value of W/C necessary to improve the strength of the products could be determined, it would be possible to produce products having uniform and improved strength.

We have also investigated the state of generation of the segregation and bleeding with reference to the mortar prepared as above described. In this investigation, we have prepared various samples of mortar in which the values of S/C were varied as 0.8, 1.0 and 1.2 as shown in the following Table 2 and in which the same amount of the dispersing agent was used and the percentage of the water uniformly adhered to the surface of sand particles was varied variously and the manner of forming bleeding was observed according to a specification of the Japanese Institute of Civil Engineering.

TABLE 2

| S/C | W/C | dispersing agent (%) | surface water (%) |
|---|---|---|---|
| 0.8 | 34.9 | 0.9 | 0-43 |
| 1.0 | 34.8 | 1.0 | 0-35.5 |
| 1.2 | 34.9 | 1.0 | 0-28.6 |

Figure 7:
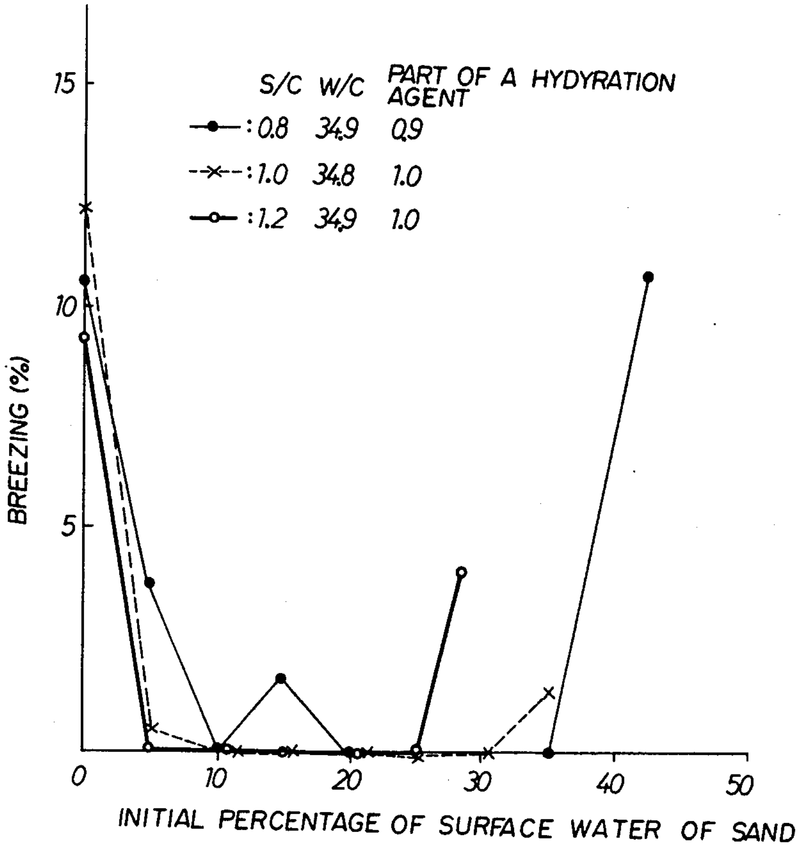
FIG. 7 is a graph showing the relationship between the percentage of the initial surface water of sand and the percentage of bleeding.

These results are plotted in FIG. 7 which shows that no bleeding occurs for the percentage of the surface water of 5 to 35% in a case where S/C is 0.8, for the percentage of the surface water of 5-30% in a case where S/C is 1.0 and for the percentage of the surface water of 10-25% in a case where S/C is 1.2

Figure 8A:
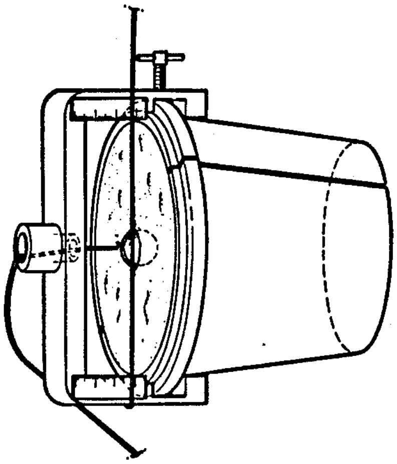
FIGS. 8A-8F are perspective views showing the manner of precipitation of a glass bead mounted on the surfaces of the mortar prepared by the method of this invention and that prepared by a prior art method after pouring the mortar into in a tank.
Figure 8B:
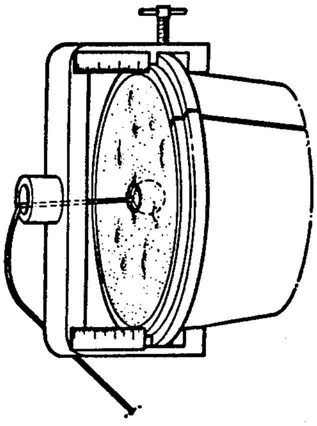
Figure 8C:
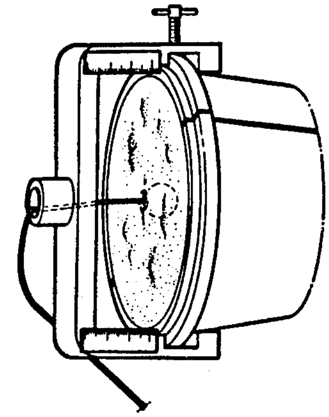
Figure 8D:
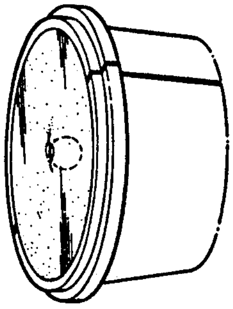
Figure 8E:
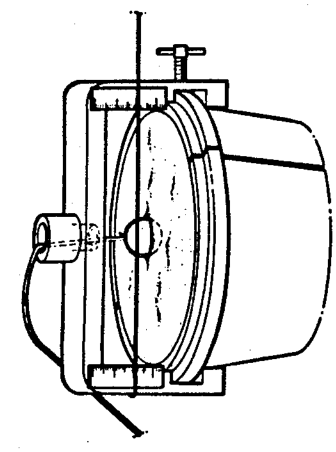
Figure 8F:
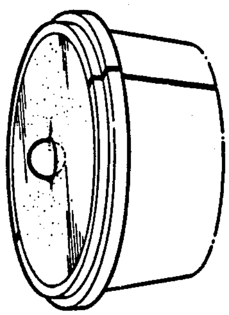

As above described if we can prepare stable shells free from segregation and bleeding the characteristics of the mortar could also be improved as evidenced by the photographs shown in FIGS. 8A-8F. In our experiment we used the same river sand as well as the same values of C/S and W/C. One sample of the mortar was prepared by simultaneously adding water, sand and cement and then kneaded together according to the prior art method, whereas the other sample of the mortar of this invention was prepared by firstly incorporating and admixing cement into sand having the percentage of surface water of 12% to form shells and then adding again water and cement. Both samples were adjusted to have $S/C=\frac{1}{2}$ and W/C of 41% and then placed in containers each having a diameter of 15 cm and a depth of 30 cm. Then glass beads having a specific gravity of 2.59 which is substantially equal to that of the aggregate as gravel usually incorporated into the mortar were placed on the mortars, and the states thereof were photographed as the time elapses, these photographs being shown in FIGS. 8A-8F. FIG. 8A shows the state immediately after a glass bead was placed on a mortar prepared by the conventional method, FIG. 8B shows the state after 6.0 minutes, FIG. 8C the states after 120 minutes, FIG. 8D the states after 24 hours, whereas FIG. 8E shows the state of the glass bead immediately after placing the same on the mortar prepared by the method of this invention, and FIG. 8F the state after 24 hours. With the mortar prepared by the prior art method, the glass bead has completely sank in the mortar after 120 minutes by 6 mm from the state shown in FIG. 8A due to breezing water, after 24 hours, the bleeding water decreased to zero so that the state became to that shown in FIG. 8D with the result that surface became irregular. In contrast, with the mortar prepared by the method of this invention, as can be noted by comparing FIGS. 8E and 8F, immediately after the glass bead was placed, the glass bead projects 15 mm from the upper surface of the mortar, and maintains the same state after elapse of 24 hours which is caused by the absence of breezing. In the conventional mortar, due to segregation and breezing, even when the overall specific gravity is the same as that of the mortar according to this invention, since the specific gravity of the upper layer of the conventional mortar decreases the glass bead sinks much deeply. This fact proves that in the mortar of this invention no segregation and breezing occurs. The characteristics of respective mortars immediately after preparation, and the amount of bleeding are shown in the following Table 3.

TABLE 3

| | J funnel (sec.) | specific gravity (Kg/) | bleeding (%) 1 H | 2 H | 3 H |
|---|---|---|---|---|---|
| conventional kneading method | 60.0 | 2.145 | form | form | 0.3% |
| shell forming | 64.0 | 2.228 | none | none | none |

As above described, the invention is applicable not only to river sand but also to various well known artificial light weight aggregates as well as iron sand. The value of Sw can be compensated for by taking into consideration the difference in the specific gravities of common river sand, artificial light weight aggregate or iron sand.

The invention is also applicable to sea sand deposited with salt or other harmful compositions because the particles of the sea sand are covered by cement shells which efficiently prevent bleeding of such harmful compositions. In Japan, supply of river sand has been decreased owing to a large demand by the concrete industry so that use of sea sand is becoming necessary. However, salt contained in sea sand greatly affects reinforcing steel bars so that such harmful compositions must be removed by washing utilizing a special reaction agent, thus increasing the cost and preventing the practical use of sea sand. In contrast, according to this invention, as stable shells are formed which seals the harmful compositions, it becomes possible to use sea sand.

As an example, sea sand produced from count of Shimokita, Aomori prefecture and having a grain size of 0.6-1.2 mm, percentage of absorbed water of about 1%, and surface water of 10% was selected. A quantity of water was supplemented to this sea sand in an amount to ensure 20% of the surface water and then admixed for one minute to uniformly distribute the water. Thereafter, a powder of cement was added to obtain C/S ratio of 1:1, and then kneaded for about 2 minutes to form shells. Then, kneading water was added in an amount to obtain a W/C ratio of 34% and the mixture was kneaded for about 2 minutes. Then 1%, based on the amount of cement of a dispersing agent was added and the kneading was continued for one minute to obtain a mortar.

For comparison, a control mortar was prepared by simultaneously adding cement and water to the same sea sand in amount to obtain C/S=1:1 and W/C of 34% (which are the same as those of the just described mortar of this invention, and the flow values of both mortars were measured and it was found that the flow value of the shelled mortar of this invention was 20.5 cm, whereas that of the control mortar was only 17.1 cm showing excellent fluidity of the mortar of this invention. The mortar of this invention has an electroconductivity several meg-ohms lower than that of the conventional mortar which means that it contains substantial amount of salt.

The shells may be composite shells which are suitable to seal salt or other harmful composition. According to one method of forming the composite shells, the cement utilized in the previous embodiment is divided into two portions. One portion is used to form primary cells and the other portion is then incorporated together with water and kneaded. Thereafter a quantity of kneading water and a dispersing agent are added and kneading operation is continued to form a slurry. For example, to the sea sand having aforementioned percentage of surface water is incorporated a powder of cement in an amount such that the ratio C:S becomes 1:0.6 and then kneaded for about 2 minutes to form shells. Then a quantity of water corresponding to the surface water is added and admixed for one minute. Thereafter, the remaining portion of the cement is added such that the ratio C:S would become 1:1 and again kneaded for 2 minutes to form secondary shells. Then, water is added in an amount such that the ratio W/C would become 34% and kneaded for 2 minutes. One percent based on the amount of cement of a dispersing agent is added and kneaded for one minute to obtain a mortar. Notwithstanding of the same values of C/S and W/C, the mortar thus obtained has a flow value of 22 cm showing that it has higher fluidity than a mortar containing only the primary shells. The water content of the paste is about 33% which is higher by 5.6% than that of the control example described above. This means that the composite shells are large and that the electroconductivity can be decreased.

The mortars of this invention described above have excellent fluidity and mouldability. A mortar prepared by the prior art method to be suitable for blasting or a prior art slurry mortar conveyed under pressure through a hose has a dropping speed of about 20 seconds when measured by a J funnel or a P funnel and such fluidity has been taken as a standard. Such mortar has a ratio of S:C≈1:1 and when added with ligninsulfonate type dispersing agent its W/C ratio is about 42% and even when added with such high quality dispersing agent as alkyl allyl sulfonate, its W/C ratio is at most 36%. Although such mortar has excellent fluidity, segregation and bleeding are remarkable so that it is always necessary to stir the mortar before conveying it with a pump. Unless agitated continuously, the mortar would separate into upper and lower portions so that it is essential to use an agitator before conveying the mortar under pressure.

The ratio S:C is at most 1.2:1 so that it is necessary to use much more sand and to use bentonite as a viscosity increasing agent. Since bleeding is inevitable, to perform a strength test of the product, a sample was prepared after causing bleeding and then cutting off the upper portion. Although the values of W/C of the actually used mortar and of the sample are not always equal, the user is satisfied with the value of W/C of the sample. When such mortar is used in so-called reverse moulding wherein the mortar is poured under pressure into a sealed space and then caused to set, it is difficult to render compact the upper portion of the moulded product. Furthermore, when the mortar is poured into a sealed moulding frame, there is a tendency of forming an air gap in the upper portion of the frame thus failing to form flat and compact upper surface. The invention can obviate these defects. Thus, although the particle size of the sand increases due to the formation of shells, since the particles become spherical and their surface portions become relatively soft, and since the W/C ratio is small thus facilitating conveyance under pressure through a hose. Moreover, since the mortar of this invention is free from segregation and bleeding it is not only unnecessary to use an agitator or the like but also not to leave an air gap when the mortar is poured into a sealed space. For example, where coarse sand having a fm of about 2.3 is used to form a mortar and then it is conveyed under pressure for pouring, according to the prior art method, the W/C ratio is made to be about 42%, 1% of a dispersing agent is added, and a powder of aluminum is incorporated for preventing segregation. The resulting mortar is then kneaded, agitated and poured by using a high performance grout mixer, an agitator and a piston pump or the like. The characteristics of the mortar are as follows.

| | |
|---|---|
| fluidity:J funnel | 20 sec. ± 3 sec. |
| average compression strength after 28 days | about 500 Kg/cm$^2$ |
| standard deviation | about 80 Kg/cm$^2$ |
| variation coefficient | 14-18% |

Such mortar may be said as the best one since its satisfies a standard design strength of 400 Kg/cm$^2$.

In contrast according to this invention a mortar having the same fluidity can be prepared by using the same coarse sand having the same fm, by making the ratio C/S to be 1:1 and W/C to be 39%, and adding 0.8% of a dispersing agent and 0.8% of delaying agent. The order of kneading is as follows.

Thus, after charging water containing sand into a mixer, a certain quantity of water is added to increase the percentage of the surface water of the sand to 20% followed by the incorporation of the whole amount of cement and a kneading step to form shells. Thereafter, additional water is added in an amount to make the ratio W/C to be equal to 39% during the kneading step and then aforementioned dispersing agent and delaying agent are added to obtain a desired motor having a small variation in the fluidity and free from segregation and bleeding. The characteristics of this mortar after 28 days are as follows:

| | |
|---|---|
| average compression strength | 675-710 Kg/cm$^2$ |
| standard deviation | 52-56 Kg/cm$^2$ |
| variation coefficient | 7-8.5% |

Thus, it can be noted that the compression strength is considerably higher than the design strength 600 Kg/cm$^2$ and that it is possible to increase the strength with the same composition and to obtain stable products of uniform strength.

As above described, according to this invention, the surface water of the sand is not determined as a disadvantageous factor and not used as a correction coefficient for the water to be incorporated, but the surface water is used as an advantageous factor to improve the quality of the concrete products. Thus, the mortar of this invention has such unexpected advantages that a high fluidity mortar free from segregation and bleeding can be prepared with a low grade composition in which the C/S ratio is 1:2.5-3 or more. Such mortar can be conveyed after storing it in a storage tank for several tens minutes without being agitated. Generally, a mortar prepared by using sand having a percentage of surface water of about 12% and wherein the W/C ratio of the shells is adjusted to be about 24% manifests most excellent characteristics. However, it should be understood that the desired characteristics can be obtained with mortars in which the ratio W/C of the shells is selected to be in a range of from 10 to 27%.

Moreover, according to this invention it is possible to prepare a high quality mortar by sufficiently decreasing the ratio C/S. Since the mortar of this invention enables to decrease the ratio C/S owing to the characteristics described above, (in other words, to enable to decrease the amount of cement and to increase the amount of sand). Regarding this point we have made the following investigations. Thus, the amount of S was increased from a ratio C/S=1:1 to that $C/S=\frac{1}{2}\sim\frac{1}{3}$. Such mortar containing lesser amount of cement was found to be satisfactory. Even when the amount of sand is increased to twice or more of that of cement it is not only possible to obtain products having considerable strength but also to prepare excellent mortar free from segregation and bleeding. These features are important because it is possible to obtain products with a mortar containing lesser amount of cement, which have comparable quality with those prepared with a mortar having a high C/S value.

As above described, green compound can be prepared by firstly forming shells and then adding water, but in some cases, when the shells are formed, the mortar can be conveyed by a conveyor or other conveying means to the field of use, then water and necessary additives are added and kneaded to obtain a desired green composition in the field. This method enables to perform important steps including adjustment of the amount of the surface water under perfect conditions in a factory or the like equipped with necessary apparatus and machines, whereby in the field, it is only necessary to add water and knead. Accordingly, the mortar prepared by this invention can be readily conveyed over a distance of several to 10 kilometers or more, for example, to the digging station in a tunnel.

To mortar of this invention can be prepared automatically in a well equipped factory by installing calculation mechanism or computer which determines the amount of water according to the following equations. The calculated amount of water is used to determine the amounts of the primary and secondary kneading water so as to automatically controlling the amounts of water to be incorporated in respective stages:

W: total amount of water to be added (which is predetermined)

$W_s$: amount of surface water on sand particles $W_c$: amount of adjusting water necessary to determine the amount of shells (which is predetermined)

$W_1$: amount of primary kneading water $W_2$: amount of secondary kneading water where $$W_1=W_c-W_s$$

$$W_2=W-W_c=W-(W_1+W_s)$$

When forming composite shells, the amount of the tertiary or quatary kneading water is determined by dividing $W_2$ or $W_1$ into two portions and $W_c$ into $W_{c1}$ and $W_{c2}$.

It is desirable to continuously perform the adjustment of the adhered water and the primary kneading. Then after adjusting the amount of the adhered water, the uniformity of adhesion would not be disturbed.

The green compositions prepared by the method described above can be used to construct any structure in civil and building works as well as prepacked products and structures constructed in the field.

To have a better understanding of this invention, the following examples are given.

EXAMPLE 1

As above pointed out, the amount of shells formed is determined by the percentage of the initial surface water uniformly adhering to the sand particles, but when a powder of cement is caused to deposit on the sand to a maximum extent regardless of the amount of the initial surface water, the average value of its W/C ratio amounts to about 18%. Thus, even when an excess amount of cement is added regardless of the amount of the initial surface water, the W/C ratio of the shelled sand would become to about 18% when surplus cement is removed with wind power, for example. Thus for example, immediately after adjusting the percentage of the surface water of various sands, when the sands are admixed with cement in a dry type continuous mixer and then surplus cement is removed by wind power at a rate of 0.3 $Nm^3$/minute, the results shown in the following Table 4 were obtained.

TABLE 4

| Type of sand surface water | Shells formed by primary Kneading C:S | | | Secondary kneaded composition | | | Total W/C | Total |
|---|---|---|---|---|---|---|---|---|
| Sw (%) | $C_1/C$ | $S/C_1$ | $W/C_1$ | $C_2/C$ | $W/C_2$ | $SA/C_2 \times 100\%$ | % | C/S |
| 3 | 0.25 | 5.87 | 17.9 | 0.75 | 44.3 | 1.48 | 37.6 | 1 : 1.44 |
| 5 | 0.34 | 3.57 | 17.9 | 0.66 | " | " | 35.4 | 1 : 1.14 |
| 7 | 0.39 | 2.74 | 17.9 | 0.61 | " | " | 34.0 | 1 : 1 |
| 9 | 0.43 | 2.00 | 18.1 | 0.57 | " | " | 33.0 | 1 : 0.86 |
| 11 | 0.46 | 1.64 | 18.1 | 0.54 | " | " | 32.2 | 1 : 0.75 |

Remark:
$C_1$ represents the amount of cement at the time of the primary kneading, and $C_2$ that of at the time of secondary kneading.

The mortars shown in Table 4 have the characteristics as shown in the following Table 5 which shows that no segregation and bleeding occurs and that the average strength after 28 days is 674.8 $Kg/cm^2$, the standard deviation is 52.71 Kg ($cm^2$, and the variation coefficient is 7.81%, these data showing that mortar is suitable for prepacked method or the like.

TABLE 5

| Sw | | fluidity | | | segregation | strength after 7 days ($Kg/cm^2$) | | strength after 28 days ($Kg/cm^2$) | |
|---|---|---|---|---|---|---|---|---|---|
| (%) | C : S | $F_o$ ($g/cm^3$) | $\Delta F_o$ ($g/cm^3$) | λ(g sec /$cm^3$) | bleeding | compression | bending | compression | bending |
| 3 | 1:1.44 | 0.316 | 0.0011 | 5.23 | none | 485 | 89.7 | 625 | 86.6 |
| 5 | 1:1.44 | 0.421 | 0.0047 | 2.73 | " | 509 | 95.0 | 613 | 96.4 |
| 7 | 1:1 | 0.632 | 0.0037 | 2.76 | " | 544 | 101.5 | 701 | 97.6 |
| 9 | 1:0.86 | 1.950 | 0.0305 | 4.74 | " | 524 | 106.3 | 733 | 113.1 |
| 11 | 1:0.75 | 0.950 | 0.0028 | 2.60 | " | 459 | 90.5 | 702 | 114.4 |

In the case of the sand having a percentage of initial water of 7-11%, the products have excellent strength and accuracy, for example, an average strength of 712 $Kg/cm^2$, a standard deviation of 18.19 $Kg/cm^2$, and a variation coefficient of 2.56%.

EXAMPLE 2

As above described the ratio W/C is about 10% at a point where the mixing torque of a mixer reaches a maximum.

When preparing a mortar by using river sand stacked in a yard and hence its water content is not known, 50 Kg of the sand was charged in a mixer and lightly agitated to make uniform the adhered water. Immediately thereafter, 2 Kg and 1 Kg of cement were sequentially added to the sand, and the mixing was continued while cement was added sequentially in an amount of 200 g at each time. The torque of the mixer driving motor was measured by an ammeter and it was found that the current reached a peak value of 0.73 ampere when 4.6 Kg of cement has been added. From this peak value it was estimated that the percentage of the surface water of the river sand was about 9%. Based on this estimated value, 10% of adjusting water based on the weight of the river sand and necessary to form shells was incorporated, and thereafter necessary amount of cement was added and admixed. The ratio W/C at this time was 20%. To this mixture were added 15% based on the amount of cement of secondary kneading water and 1% based on the amount of cement of a dispersing agent to obtain a desired mortar.

The resulting mortar had a C/S ratio of 1:1, a W/C ratio of 35%, a fluidity $F_o$ of 1.32 $g/cm^3$, a $\Delta F_o$ of 0.03 $g/cm^3$, a λ of 3.8 g·sec/$cm^3$, and was found to be free from any segregation and bleeding. A sample moulded with this mortar had a compression strength of 528 $Kg/cm^2$ and a bending strength of 107.8 $Kg/cm^2$ after 7 days, and a compression strength of 742 $Kg/cm^2$ and a bending strength of 112.6 $Kg/cm^2$ after 28 days.

EXAMPLE 3

18 samples of the composition of this invention were prepared in which the ratio C/S was 1:0.8～1:1.2.

Shells were formed by using mixing and aggitating apparatus which set the values of W, $W_s$, $W_c$, $W_1$ and $W_2$. All these samples showed the following excellent results:

| | |
|---|---|
| average compression strength (after 28 days) | 689.4 $Kg/cm^2$ |
| standard deviation | 54.4 $Kg/cm^2$ |
| variation coefficient | 7.9% |

In contrast, a mortar (incorporated with an aluminum powder) prepared to manifest the highest fluidity according to the prior art method showed an average compression strength of about 500 $Kg/cm^2$, a standard deviation of about 80 $Kg/cm^2$, and a variation coefficient of 14–18% after 28 days. These data show that the mortar of this invention is superior than the prior art mortar.

Figure 9:
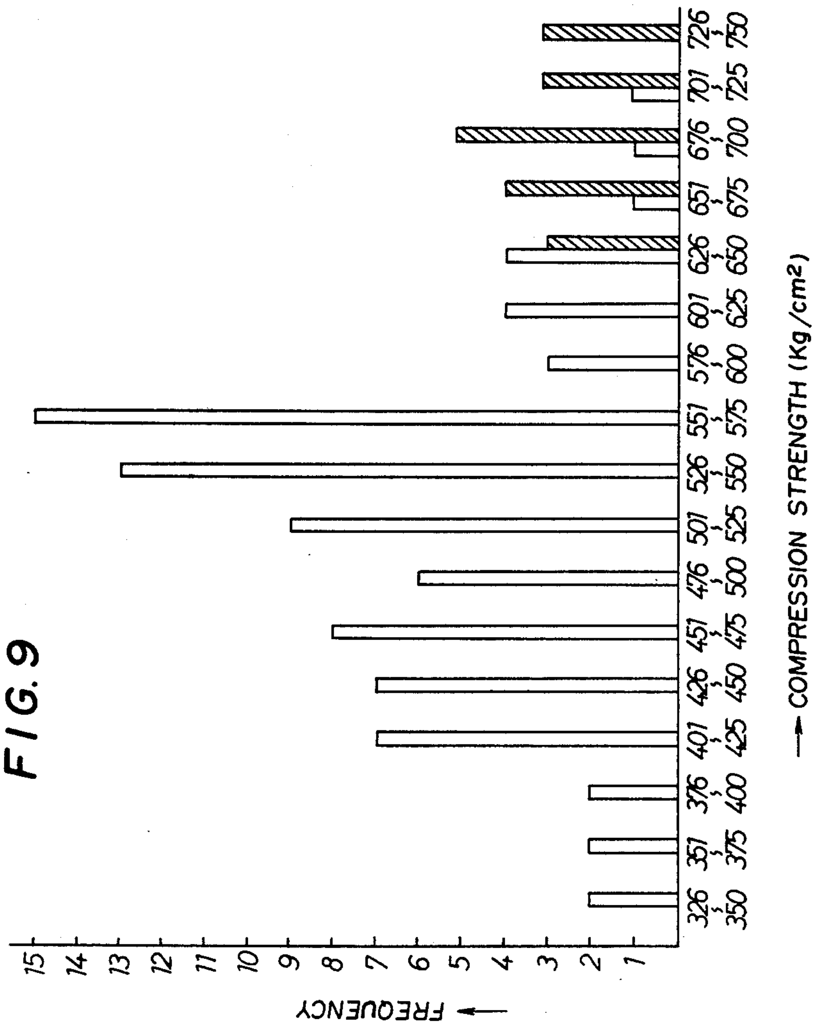
FIG. 9 is a bar graph comparing the difference between the sample of Example 3 (to be described later as this invention and that prepared by the prior art method.

FIG. 9 is a bar graph comparing the result of Example 3 with those of 85 samples of mortar prepared by the prior art method to have similar fluidity. With the best mortar prepared by the prior art method to be conveyable by a hose, the compression strength varies greatly over a wide range of 400 $Kg/cm^2$ as shown by not hatched bars, each showing a range of 25 Kg/cm². Among 85 samples, a peak of the frequency appears in a range of 551-575 Kg/cm² and another samples showed lower frequency so that the average compression strength is of the order described above. On the other hand, in the mortar of this invention shown by hatched bars the extent of variation is only ¼. Moreover,

EXAMPLE 4

This example relates to a mortar containing lesser amount of cement such that C/S=1:2 or less. The following Table 6 shows various characteristics and ingredients of the mortar utilizing sand with adjusted percentage of the surface water.

TABLE 6

| No. | C/S | dispersing agent SA (%) | % of surface water of sand SW (%) | W/C (%) shell forming | W/C (%) Total | J funnel | compression strength after 28 days upper | compression strength after 28 days lower | upper/lower | fluidity | segragation | bleeding | judgement |
|---|---|---|---|---|---|---|---|---|---|---|---|---|---|
| | | | | | 39.0 | 45.0 | 512 | 468 | 1.094 | good | small | none | good |
| | | | | | 40.0 | 34.0 | 432 | 533 | 0.811 | " | medium | " | " |
| 1 | 1/2 | 1.5 | 7 | 14 | 42.0 | 23.0 | 408 | 473 | 0.863 | " | " | " | " |
| | | | | | 44.0 | 16.9 | 323 | 522 | 0.619 | " | " | " | fairly good |
| | | | | | 46.0 | 13.0 | 335 | 404 | 0.829 | " | large | noted | bad |
| | | | | | 39.0 | 63.0 | 468 | 543 | 0.862 | fairly good | small | none | fairly good |
| | | | | | 41.5 | 32.0 | 431 | 325 | 1.336 | good | none | " | good |
| 2 | 1/2 | 1.5 | 9 | 18 | 42.5 | 28.0 | 441 | 438 | 1.010 | " | " | " | excellent |
| | | | | | 43.5 | 24.0 | 455 | 325 | 1.400 | " | " | " | " |
| | | | | | 45.5 | 20.0 | 402 | 462 | 0.870 | " | medium | " | " |
| | | | | | 46.5 | 14.1 | 421 | 518 | 0.813 | " | " | " | " |
| | | | | | 36.3 | 60.0 | 612 | 659 | 0.979 | fairly good | none | none | good |
| | | | | | 37.0 | 40.0 | 611 | 632 | 0.967 | " | " | " | excellent |
| 3 | 1/2 | 1.5 | 22 | 24 | 39.0 | 30.0 | 611 | 598 | 1.022 | " | " | " | " |
| | | | | | 40.0 | 24.0 | 513 | 579 | 1.024 | " | " | " | " |
| | | | | | 41.0 | 19.0 | 561 | 565 | 0.993 | " | " | " | " |
| | | | | | 43.0 | 17.0 | 512 | 511 | 1.002 | " | " | " | " |
| | | | | | 36.0 | 117.0 | | | | bad | | | |
| | | | | | 37.0 | 68.0 | 542 | 523 | 1.036 | fairly good | small | none | good |
| 4 | 1/2 | 1.5 | 14 | 28 | 38.0 | 49.5 | 452 | 483 | 0.936 | good | none | " | excellent |
| | | | | | 40.0 | 29.0 | 305 | 345 | 0.884 | " | small | " | good |
| | | | | | 42.0 | 19.8 | 432 | 565 | 0.765 | " | medium | " | fairly good |
| | | | | | 43.0 | 16.0 | 421 | 382 | 1.102 | " | " | " | " |
| | | | | | 50.0 | 35.0 | 521 | 532 | 0.979 | good | none | none | excellent |
| 5 | 1/2.5 | 1.5 | 8.8 | 22 | 52.0 | 20.8 | 462 | 515 | 0.897 | " | " | " | " |
| | | | | | 54.0 | 18.0 | 473 | 492 | 0.961 | " | " | " | " |
| | | | | | 56.0 | 13.5 | 472 | 395 | 1.195 | " | " | " | " |
| | | | | | 58.0 | 46.2 | 368 | 392 | 0.939 | good | none | none | excellent |
| 6 | 1/3 | 1.5 | 7.3 | 22 | 60.0 | 24.2 | 335 | 383 | 0.875 | " | medium | " | " |
| | | | | | 62.0 | 19.6 | 285 | 378 | 0.754 | " | " | " | fairly good |
| | | | | | 64.0 | 19.0 | 328 | 391 | 0.839 | " | " | noted | bad |

with the prior art method, the maximum strength was obtained at a probability of only 1 to 2%, whereas, the average compression strength of this invention is higher than that of the prior art mortar by more than 170 Kg/cm². The reason that the highest strength was obtained in the prior art mortar at a probability of only 1-2% is considered to be caused by the position of sampling.

These data show that the performance of the mortar of this invention is greatly improved over the best mortar prepared by the prior art method and that its W/C ratio was decreased 3% so that it is not necessary to admix the mortar with an agitator and yet the average strength was increased by more than 170 Kg/cm², the standard deviation and the variation coefficient were increased by at least 25 Kg/cm², and 7% respectively thereby improving the accuracy of the products. Further, mortars having a standard strength of more than 600 Kg/cm² (which is higher by 200 Kg/cm² than the prior art mortar) and can be conveyed under pressure can be prepared by using the same sand and composition as the prior art mortar.

EXAMPLE 5

This example relates to the use of shelled mortar as concrete. Thus, the mortar was prepared by using sand having a percentage of initial surface water of 12% and ratios W/C=42% and C/S=1:2. The mortar had a specific gravity of 2.286, a $\Delta F_o$ of 0, a $\lambda$ of 1.50 g.sec./cm³. Gravel was admixed with this mortar to prepare 5 concrete samples as shown in the following Table 7.

TABLE 7

| | W/C (%) | cement (Kg/cm³) | sand (Kg/cm³) | gravel (Kg/cm³) | water (l/m³) | dispersing agent (l/m³) | SL slamp value (cm) |
|---|---|---|---|---|---|---|---|
| A | 42.0 | 428 | 859 | 918 | 176.7 | 4.28 | 23.2 |
| B | " | 383 | 769 | 1096 | 156.7 | 3.83 | 19.0 |
| C | " | 347 | 696 | 1238 | 142.5 | 3.47 | 11.6 |
| D | " | 316 | 635 | 1358 | 130.2 | 3.16 | 4.4 |
| E | 34.6 | 445 | 659 | 1173 | 149.4 | 4.45 | 2.1 |

The compression strength, average value thereof, the standard deviation S and the variation coefficient of these concrete samples respectively measured after 3, 7 and 28 days are shown in the following Table 8.

TABLE 8

| 3 days | | | | 7 days | | | | 28 days | | | |
|---|---|---|---|---|---|---|---|---|---|---|---|
| compression strength | | S | V | compression strength | | S | V | compression strength | | S | V |
| (Kg/cm²) | (Kg/cm²) | (Kg/cm²) | (%) | (Kg/cm²) | (Kg/cm²) | (Kg/cm²) | (%) | (Kg/cm²) | (Kg/cm²) | (Kg/cm²) | (%) |
| 246 | (average) | | | 335 | (average) | | | 441 | (average) | | |
| 246 | 248 | 2.8 | 1.1 | 347 | 335 | 9.8 | 2.9 | 428 | 443 | 12.7 | 2.9 |
| 252 | | | | 323 | | | | 459 | | | |
| 257 | | | | 344 | | | | 459 | | | |
| 273 | 262 | 7.6 | 2.9 | 347 | 346 | 1.7 | 0.5 | 419 | 446 | 23.5 | 5.3 |
| 257 | | | | 348 | | | | 466 | | | |
| 261 | | | | 328 | | | | 420 | | | |
| 266 | 266 | 3.7 | 1.4 | 369 | 354 | 18.5 | 5.2 | 448 | 452 | 27.5 | 6.1 |
| 270 | | | | 365 | | | | 487 | | | |
| 306 | | | | 416 | | | | 499 | | | |
| 322 | 312 | 7.3 | 2.3 | 397 | 388 | 27.3 | 7.0 | 525 | 519 | 14.5 | 2.8 |
| 307 | | | | 351 | | | | 533 | | | |
| 372 | | | | 372 | | | | 525 | | | |
| 338 | 361 | 16.0 | 4.4 | 431 | 416 | 31.3 | 7.5 | 510 | 532 | 21.4 | 4.0 |
| 372 | | | | 444 | | | | 561 | | | |

In spite of a small concrete quantity, i.e. C/S=1:2, a considerably large strength was obtained and yet resulting concrete had a small standard deviation and variation coefficient.

Figure 10:
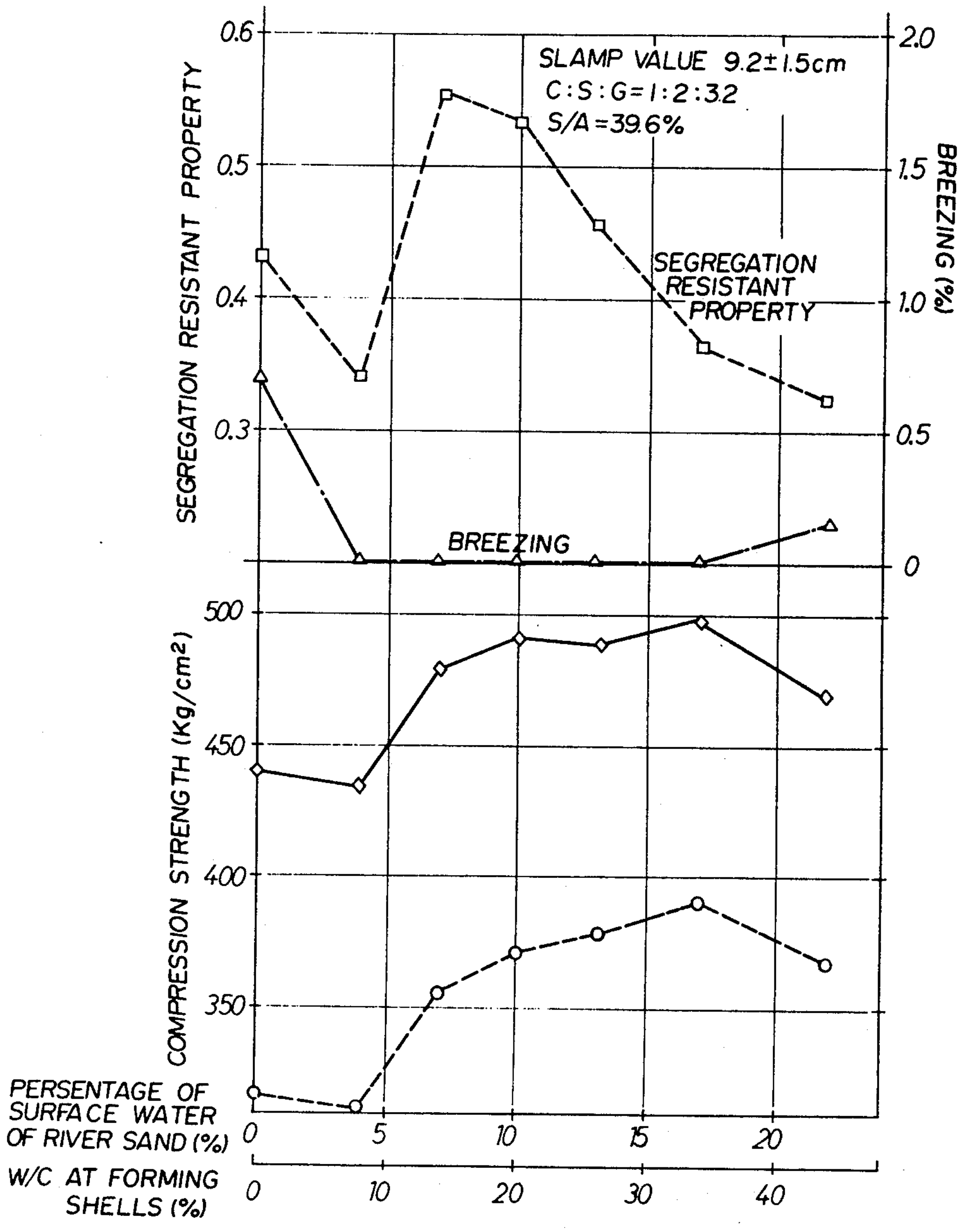
FIG. 10 is a graph showing the compression strength after 7 and 28 days and segregation resistant properties of various fresh concretes of Example 5.

Furthermore, in spite of preparing mortar as described above, the inventors variously adjusted the quantity of the water deposited on the surface of the mixture of sand and gravel, and then admixed a powder of cement with said mixture to obtain various fresh concretes regulated in the ratio C:S:G=1:2:3.2. The compression strengths after 7 and 28 days and segregation resistant properties of said fresh concretes were measured as shown in the FIG. 10 which shows the consequence similar to that of said Table 9.

The mortar described above was used to prepare a blasting concrete containing 484 Kg of cement, 1311 Kg of sand, 333 Kg of gravel, and 168 Kg of water (W/C≈35%), each per cubic meter. After blasting the concrete, the average strength, the standard deviation and variation coefficient were measured as shown in the following Table 9 respectively after 3, 7 and 28 days.

TABLE 9

| | x (Kg/cm²) | S (Kg/cm²) | v (%) |
|---|---|---|---|
| 3 days | 348 | 31.8 | 9.1 |
| 7 days | 437 | 29.1 | 6.6 |
| 28 days | 526 | 18.6 | 3.5 |

Remark:
x represents the compression strength,
S the standard deviation and
v the variation coefficient

EXAMPLE 6

In this example, river sand was deairated under s reduced pressure, and by pouring water, the amount of the surface water was adjusted to 12% by using pressure difference. After forming shells by incorporating cement into the river sand in an amount such that C/S=1:2, 1% based on the amount of cement of a dispersing agent and water were added to obtain a mortar adjusted its W/C to be 42%. The mortar was then poured under a pressure of about 0.5 Kg/cm² through a pouring port provided at one side of a moulding frame having a width of 1 m, a length of 2 m and a thickness of 15 cm and prepacked with No. 4 crushed stone, the pressure of the frame being reduced prior to the pouring operation. It has been almost impossible to pour into a prepacked frame a mortar containing such large amount of sand that its C/S ratio is 1:2, but the mortar utilizing shelled sand could satisfactory poured into the frame because the mortar had a high fluidity, that is $F_o$=1.841 g/cm³, $\Delta F_o$=0.0102 g/cm³, $\lambda$=2.56 g.sec/cm³ and a J funnel flow=44.4 sec. The compression strength of the product 28 days after pouring or moulding was 498–511 Kg/cm² showing the quality of the product was excellent and uniform.

EXAMPLE 7

In the same manner as in Example 6 the amount of the surface water of river sand was adjusted to 9% by deairation with reduced pressure. One part of cement was added to two parts of this river sand to form shelled sand particles and then a green mortar was prepared by adding water in an amount such that W/C ratio becomes 31.2%. On the other hand, cement was added to river sand whose percentage of surface water has been adjusted to 7% by the same method as above described to form shelled sand particles, and cement shells were formed about gravel having a size of 5–15 mm and containing surface water. An 1:1 mixture of the selled sand and the shelled gravel was conveyed by high pressure air, and near a blasting nozzle, above described mortar was added to the mixture at a ratio of 80 to 100, and the resulting mixture was blasted against a surface to be coated with concrete.

The compression strength of the concrete 3 days after blasting was 36.3 Kg/cm², 483 Kg/cm² after 7 days and 597 Kg/cm² after 28 days.

EXAMPLE 8

The amount of the surface water was adjusted to 10% in the same manner as in Example 6 under a reduced pressure condition. 900 Kg of this adjusted sand and 340 Kg of cement were mixed together to form shells, and then 80 Kg of water, 900 Kg of No. 4 crushed stone and 6.8 Kg of a quick setting agent were added to form a green concrete having a fluidity of 2 cm in terms of the slamp value. This green concrete was conveyed under pressure and blasted against a vertical surface through a blasting nozzle.

In this case, the amount of dust generated was 150 CPM and the percentage of reflection was 14.7%. The compression strength of the concrete was 193 Kg/cm² after 7 days, and 333 Kg/cm² after 28 days, showing that the quality of the blasted concrete is excellent.

In contrast, a green concrete having the same composition as that of this invention but not formed with shells and was prepared by simultaneously charging all ingredients had a slamp value of 3, and the amount of dust generated when this concrete was blasted with the same blasting machine was 200 CPM and the percentage of reflection was 25.3%, both being larger than those of the green concrete of this invention. The resulting concrete had a compression strength of 175 $Kg/cm^2$ after 7 days and 26.4 $Kg/cm^2$ after 28 days, both being lower than those of the concrete according to this invention.

EXAMPLE 9

1100 Kg of sand whose surface water has been adjusted in the same manner as in Examples 6 and 7 was admixed with 463 Kg of cement to form shelled sand. To this shelled sand were added 429 Kg of gravel and 27.8 Kg of a quick setting agent and the mixture was conveyed under pressure in a dry state. At the blasting station 55 Kg of water was added to the mixture and the resulting mixure was then blasted against a vertical wall. At this time, the amount of dust generated was 296 CPM while the percentage of reflection was 21%, and the resulting concrete had a compression strength of 175 $Kg/cm^2$ after 7 days and 367 $Kg/cm^2$ after 28 days.

In contrast, according to the prior art method wherein sand having 1.5–4% of adhered water was admixed with the same another constituents and 180 Kg of water was added to the dry mixture at the blasting station to obtain a ratio W/C of 44% in concrete. The amount of dust was 512 CPM and the percentage of reflection was 32.4%. Further, the resulting concrete had a compression strength of about 160 $Kg/cm^2$ *after* 7 days and 245 $Kg/cm^2$ after 28 days.

EXAMPLE 10

Silicate sand having a grain size of less than 5 mm was deairated under the same reduced pressure as in Examples 1 and 2, then water was filled in the interstis of the sand particles. Thereafter, the water between the sand particles was removed by utilizing the pressure difference between the sand and the atmosphere so as to adjust the amount of surface water to 12%. This adjusted silicate sand was admixed with alumina cement at a ratio of 1:1 to form shells on the sand particles, and the resulting mortar was poured into a sealed moulding frame having a volume of 0.4 $m^3$ and prepacked with such fire proof coarse aggregate as graphite and magnesia.

This mortar had a fluidity $F_o=16$ $g/cm^3$, $\Delta F_o=0.04$ $g/cm^3$, and $\lambda=1.5$ $g.sec/cm^3$. This fluidity permitted smooth flow of the mortar into the interstis between the fire proof coarse aggregate described above under a reduced presssure of the order of 6.00 mmHg by utilizing the pressure difference between it and the atmospheric pressure. The pouring of the mortar was stopped when it overflows through an overflow port provided on the opposite side of the moulding frame and connected to a tank of reduced pressure. Then atmospheric air was introduced into the moulding frame to apply pressure onto concrete.

The fracture strength of the resulting concrete was 26.5 $Kg/cm^2$ after it had been dried naturally without directly exposing it to sun light. This product can be used as a not fired refractory block to construct floors of various type furnaces.

EXAMPLE 11

To a mixture of part of an artificial aggregate having a specific gravity of 1.63 and a percentage of absorbed water of 12.7, and one part of a light weight fine aggregate whose surface water had been adjusted to 10% by a water impregnation treatment under a reduced pressure and by a subsequent dehydration processes utilizing pressure differential, was added 0.5 part of cement to adjust its W/C ratio to 20%. The resulting mixture was mixed together by means of a mixer and then 22% based on the amount of cement of water, and 1.5% based on the amount of cement of a dispersing agent were incorporated and mixed together to form a shelled mortar.

The resulting mortar containing the artificial light weight aggregate had a ratio C/S of 1:2, a ratio W/C of 43.5% and a fluidity of $F_o=2.2$ $g/cm^3$, $\Delta F_o=0.12$ $g/cm^3$ and $\lambda=4.2$ $g.sec/cm^3$. It was confirmed that this mortar was free from any segregation and breezing. The concrete sample moulded with this mortar had a compression strength of 326 $Kg/cm^2$ after 7 days and 482 $Kg/cm^2$ after 28 days which are the desired characteristics for the moulded concrete utilizing the aforementioned artificial light weight aggregate.

EXAMPLE 12

This example describes pouring of the shelled mortar of this invention into a supporting structure for a steel pipe installed in a tunnel.

More particularly, a fine aggregate with its percentage of the surface water on the sand particles had been adjusted to 20% was used and cement was added to this fine aggregate in an amount to assure a C/S ratio of 1:1 and the mixture was agitated for two minutes. Then water was added in an amount to render its W/C ratio to be 35%, and then 0.8% based on the amount of cement of a dispersing agent was added followed by kneading to prepare a green mortar. This mortar was conveyed by a mortar pump to the working station spaced from the kneading apparatus by about 100 m to pour the mortar into pipes having an inner diameter of 30 cm and adapted to support a steel pipe having a height of 7.7 m. The mortar thus prepared had a fluidity wherein $F_o=1.273$ $g/cm^3$, $\Delta F_o=0.0074$ $g/cm^3$, and $\lambda=1.09$ $g.sec/cm^3$. The pressure of the mortar pump utilized to convey the mortar to the working station, about 100 m apart from the pump was 5–6 $Kg/cm^2$, and the pressure of the pump required to push up the mortar to the top of the supporting pipe having a height of 7.5 m was about 4–5 $Kg/cm^2$.

28 days after pouring the mortar into the supporting pipe, the solidified mortar in the pipe was cut into three sections, and samples, each having a diameter of 5 cm and a length of 10 cm, were obtained from respective sections by coring technique. The compression strength of the samples were measured. It was found that the average compression strength is 659.9 $Kg/cm^2$, the standard deviation is 65.0 $Kg/cm^2$ and the variation coefficient is 9.8%. The ratio of the compression strengths of the upper section and the lower section was 1.074 which shows that the solidified mortar reinforced by the steel pipe has a uniform and sufficient strength.

EXAMPLE 13

When preparing a mortar identical to that of Example 10, the shells were formed on the outside of a tunnel. The resulting shelled composition, apparently in a dry state, was conveyed to a deep portion of a tunnel where the steel pipe supporting structure is to be constructed. 2 hours after preparation of the composition, water was added thereto in an amount such that the ratio W/C would be 35% like Example 10, and after incorporating a dispersing agent the mixture was kneaded. Then the kneaded mortar was forced into the supporting pipe (which is similar to that shown in Example 10) under a pressure of 4–5 Kg/cm$^2$.

The solidified mortar in the supporting pipe was sampled in the same manner as in Example 10 and it was found that the average compression strength is 677.2 Kg/cm$^2$, that the standard deviation is 37.6 Kg/cm$^2$, and that the variation coefficient is 5.6%. These data show that the supporting pipe is excellent. The ratio of the compression strengths between the upper and lower sections of this example was 0.908. It was also noted that no segregation and breezing were occurred just in the same manner as in Example 10. Further, no precipitation (volume change) was noted.

Similar mortar was prepared according to the prior art method, that is without forming shells, and poured in the supporting steel pipe in the same manner as in Example 10 and 11. Even with the same C/S and W/C ratios, the compression strength of the solidified mortar was lower than that of the invention by about 25%. The standard deviation was 78.5 Kg/cm$^2$ and the variation coefficient was 16.3% which are about twice of those of this invention.

EXAMPLE 14

When preparing a heavy weight concrete for shielding a nuclear reactor comprising 1330 Kg of a fine aggregate of magnesite, 195 Kg of a coarse aggregate of magnesite having a grain size of less than 30 mm, and 350 Kg of cement, 70 Kg of water was uniformly deposited on the fine aggregate and then the cement was incorporated to form shells. Thereafter 122 Kg of water and the coarse aggregate were incorporated and kneaded to obtain a green concrete having a weight of 3950 Kg. The amount of water breezed from concrete structure formed with this green concrete was extremely low, i.e. only 0.2%. Also any segregation was not noted and the compression strength after 28 days was 452 Kg/cm$^2$. In contrast a concrete having the same composition and weight but prepared by admixing all ingredients at the same time and not formed with shells showed a quantity of breezed water of 1.2% at the time of pouring, and the resulting concrete had a compression strength of 375 Kg/cm$^2$ after 28 days.

EXAMPLE 15

0.2 part of water was uniformly deposited on the surface of the same fine aggregate of magnesite as that used in Example 14, and 1 part of cement was added to the aggregate to form shells. Thereafter 0.26 part of water and 0.01 part of a hydration agent were added and the mixture was kneaded to obtain a green mortar having a flow value of 21 sec. and $F_o$=1.2 g/cm$^2$. A moulded concrete produced by pouring this green mortar into a space prepacked with a coarse aggregate consisting of magnesite having a particle size of 35–40 mm was free from bleeding and had a compression strength of 343 Kg/cm$^2$ after 28 days.

On the other hand, when a green mortar utilizing the same composition and the same fine aggregate containing no surface water and not formed with shells was poured into the identical prepacked space, the resulting product showed a breezing of 1.5% and a compression strength of 265 Kg/cm$^2$ after 28 days. Similar green mortar formed with shells but contains 0.3 part of surface water was poured under the same condition and the product had a breezing of 3.2% and a compression strength of 278 Kg/cm$^2$ after 28 days. Thus the latter two control examples have inferior characteristics than that mentioned in the first portion of this example.

As above described we have clarified the state of the surface of the aggregate in such green composition as green mortar or green concrete as well as the paste presenting in the interstise of the aggregate particles thus pointed out unreasonableness of the prior art concept according to which it has been considered important to merely maintain the concentration of the green composition at a definite value. Based on this discovery, we have succeeded to prepare novel green composition free from any segregation, breezing and precipitation of the aggregate. Moreover, according to this invention it is not only possible to assure such advantageous novel effects even when the amount of the fine aggregate is increased but also to provide satisfactory fluidity and moldability. The invention is also applicable to sea sand, method fibers, inorganic fibers metal particles and artificial light weight fine aggregate. Thus, the invention enables to produce concrete products at low cost having accurate dimension and uniform quality.

Above described relationship shown in FIG. 6 can be expressed by the following equation $$\frac{W}{C'} = \frac{C}{C'}\left(\frac{S}{C}\right) Sw$$

where C represents the amount of cement in the entire composition, and C' the amount of cement at the time of forming shells.

This equation can be modified for a concrete also containing a coarse aggregate.

$$\frac{W}{C'} = \frac{C}{C'}\left\{\left(\frac{S}{C}\right) Sw + \left(\frac{G}{C}\right) Gw\right\}$$

where G represents the amount of the coarse aggregate and Gw the percentage of the surface water thereof.

The ratio of water to cement at the time of forming shells can be determined according to these equations, and the ratio C:S and the water content of sand.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of preparing a green composition having a pre-determined ratio of water to a powder of hydraulic substance wherein the hydraulic substance is admixed with water and a fine aggregate, said method comprising the steps of preparing particles of said fine aggregate in which water is uniformly deposited on the entire surface thereof so as to exclude air voids, by adding a primary water to said particles in an amount necessary to optimize the percentage of the surface water on said particles, incorporating a powder of said hydraulic substance with said particles thus absorbing said powder of hydraulic substance with the surface of said particles to form shells about said particles, said shells having a smaller ratio of water to powder than said pre-determined ratio of said green composition, adding a secondary water to the shelled particles in an amount providing the remaining portion of the necessary water and kneading the resulting mixture.

2. The method according to claim 1 wherein said hydraulic substance comprises cement or plaster.

3. The method according to claim 1 wherein said fine aggregate is one or more members selected from the group consisting of sand, sea sand and artificial light weight aggregate.

4. The method according to claim 1 wherein said green composition further contains gravel.

5. The method according to claim 4 wherein the shells of said hydraulic substance are formed about the surface of said gravel as well as about the particles of said fine aggregate.

6. The method according to claim 1 wherein said fine aggregate comprises sea sand containing salt and other harmful compositions.

7. The method according to claim 1 wherein said percentage is selected such that when said particles are admixed with said powder said shells having a ratio of water to powder from 10 to 30 percent.

8. The method according to claim 1 wherein the amount of said shell is determined by said percentage of surface water of said particles.

9. The method according to claim 1 wherein said optimum percentage of the surface of said particles is determined by the ratio of said powder to said particles to be incorporated.

10. The method according to claim 1 wherein said shells are in a capillary state.

11. The method according to claim 1 wherein the surplus amount of powder remaining among the shelled particles is removed by wind velocity.

12. The method according to claim 1 wherein the amount of water to be added is calculated according to the following equations:

$$W_1 = W_c - W_s$$

$$W_2 = W - W_c = W - (W_1 + W_s)$$

where W represents the total amount of water necessary to prepare said green composition, Ws the amount of water deposited on the surface of said particles, Wc the amount of water that determines the amount of said shells, $W_1$ the amount of said primary water and $W_2$ the amount of said secondary water.

13. The method according to claim 1 wherein said green composition has a ratio of said powder to said particles of 1:2 to 1:3.

14. The method according to claim 1 wherein said green composition comprises mortar or concrete.

15. A method of utilizing a green composition having a pre-determined ratio of water to a powder of hydraulic substance wherein the hydraulic substance is admixed with water and a fine aggregate, said method comprising the steps of preparing particles of said fine aggregate in which water is uniformly deposited on the entire surface thereof so as to exclude air voids by adding a primary water to said particles in an amount necessary to optimize the percentage of the surface water on said particles, incorporating a powder of said hydraulic substance with said particles thus absorbing said powder of hydraulic substance with the surface water of said particles to form shells about said particles, said shells having a smaller ratio of water to powder than said pre-determined ratio of said green composition, adding a secondary water to the shelled particles in an amount providing the remaining portion of the necessary water, kneading the resulting mixture to produce said green composition, pouring said green composition into a mold space thereby forming a solidified hydraulic substance.

16. A method of utilizing a green composition having a pre-determined ratio of water to a powder of hydraulic substance wherein the hydraulic substance is admixed with water and a fine aggregate, said method comprising the steps of preparing particles of said fine aggregate in which water is uniformly deposited on the entire surface thereof so as to exclude air voids by adding a primary water to said particles in an amount necessary to optimize the percentage of the surface water on said particles, incorporating a powder of said hydraulic substance with said particles thus absorbing said powder of hydraulic substance with the surface water of said particles to form shells about said particles, said shells having a smaller ratio of water to powder then said pre-determined ratio of said green composition, adding a secondary water to the shelled particles in an amount providing the remaining portion of the necessary water, kneading the resulting mixture to produce said green composition, incorporating a coarse aggregate into said composition, conveying said resulting mixture to a remote station and blasting said green composition so as to coat a desired surface.

17. The method according to claim 15 wherein said space is prepacked with a coarse aggregate.

18. The method according to claim 16 wherein water is added to said green composition at said remote station.

19. The method according to claim 15 wherein said cement comprises alumina cement and said fine aggregate is fire proof, and wherein said green composition is incorporated with a fire proof coarse aggregate thereby forming fire proof solid body.

20. The method according to claim 15 wherein said green composition is incorporated with inorganic fibers.

21. The method according to claim 20 wherein said inorganic fibers are iron fibers.

22. The method according to claim 15 wherein said first and second compositions are mixed together before a capillary region is reached thereby forming said shells having a ratio of water to the powder of said hydraulic substance of 20-24% ±3%, and unstable coatings of said hydraulic substance about said shells.

* * * * *